United States Patent [19]

Koehler

[11] Patent Number: 4,479,385

[45] Date of Patent: Oct. 30, 1984

[54] DOUBLE RESONATOR CANTILEVER ACCELEROMETER

[75] Inventor: Dale R. Koehler, Albuquerque, N. Mex.

[73] Assignee: The United States of America as represented by the Department of Energy, Washington, D.C.

[21] Appl. No.: 422,515

[22] Filed: Sep. 23, 1982

[51] Int. Cl.³ .............................................. G01P 15/08
[52] U.S. Cl. .............................. 73/517 R; 73/DIG. 1; 73/517 AV
[58] Field of Search ....... 73/517 R, 517 AV, DIG. 1, 73/4

[56] References Cited

U.S. PATENT DOCUMENTS

| | | | |
|---|---|---|---|
| 2,928,668 | 3/1960 | Blasingame | 73/517 AV |
| 3,033,043 | 5/1962 | Runft | 73/517 AV |
| 3,071,974 | 1/1963 | Peterson | 73/517 AV X |
| 3,143,891 | 8/1964 | Voutsas | 73/517 AV |
| 3,269,192 | 8/1966 | Southworth et al. | 73/517 AV |
| 3,319,472 | 5/1967 | Reefman | 73/517 AV |
| 3,382,724 | 5/1968 | Wilcox | 73/517 AV |
| 3,386,292 | 6/1968 | Watson et al. | 73/517 AV |
| 3,434,352 | 3/1969 | Jewell et al. | 73/517 AV |
| 3,465,597 | 9/1969 | Riordan | 73/517 AV |
| 3,470,400 | 9/1969 | Weisbord | 73/517 AV X |
| 3,479,536 | 11/1969 | Norris | 73/517 AV X |
| 3,486,383 | 12/1969 | Riordan | 73/517 AV |
| 3,505,866 | 4/1970 | Weisbord | 73/141 |
| 3,541,866 | 11/1970 | Mathey et al. | 73/517 AV |
| 4,091,679 | 5/1978 | Furusawa et al. | 73/517 AV X |
| 4,215,570 | 8/1980 | Nisse | 73/141 R |

OTHER PUBLICATIONS

"Precision Digital Pressure Transducer", by Paros from ISA Transactions vol. 12, pp. 173-179, 1973.

Primary Examiner—James J. Gill
Attorney, Agent, or Firm—George H. Libman; Albert Sopp; Michael F. Esposito

[57] ABSTRACT

A digital quartz accelerometer includes a pair of spaced double-ended tuning forks fastened at one end to a base and at the other end through a spacer mass. Transverse movement of the resonator members stresses one and compresses the other, providing a differential frequency output which is indicative of acceleration.

7 Claims, 5 Drawing Figures

DOUBLE RESONATOR CANTILEVER ACCELEROMETER

The present invention relates generally to accelerometers and more particularly to a mass loaded cantilever accelerometer. The United States Government has rights in this invention pursuant to Contract No. DE-AC04-76DP00789 between the Department of Energy and Sandia Corporation.

BACKGROUND OF THE INVENTION

A useful accelerometer must be sensitive to desired accelerations and insensitive to spurious, undesirable accelerations. For instance, an accelerometer for measuring the acceleration of a rocket must be sensitive to acceleration of the rocket in the direction of motion and insensitive to the many accelerations in other directions caused by vibration of the rocket. In addition, the accelerometer should also be capable of providing a digital output proportional to acceleration for use with conventional digital equipment.

One example of an early digital accelerometer is shown in U.S. Pat. No. 2,928,668 of Blasingame, where an accelerometer produces an output of two alternating voltages whose frequencies are related to the acceleration of the instrument. In Blasingame, a reed with a magnet on its end is caused to vibrate at its natural frequency by an electrical pickup arranged to measure the velocity of the vibrating magnet and feed its output to an amplifier which supplies current to solenoids arranged to supply side forces on the reed proportional to the magnet's velocity. Two identical reeds are arranged back to back so that the natural frequency of one is increased while the frequency of the other is decreased in response to acceleration along the longitudinal axis of the reeds. The two outputs of this system are combined to remove the unaccelerated natural frequency of this system and minimize drift due to temperature affects.

A later digital accelerometer is shown in U.S. Pat. No. 3,269,192 of Southworth, Jr., et. al. In this patent, a tuning fork has two tines clamped at each end and vibrated 180° out of phase. A dense inertial proof mass is secured to one pair of ends of the tines and supported against cross-axis movement perpendicular to the tines while being free to move longitudinally so as to extend or compress the tines when the mass is accelerated.

Although Southworth does incorporate the double-ended tuning fork design of this invention, it utilizes a large mass (as opposed to the small mass of the invention) which is constrained to motion along the tine axis. No such constraints are part of the invention because the invention measures acceleration perpendicular to the tine axis. In Southworth, movement of the mass along the axis either puts both tuning forks in tension or in compression, while movement of the mass of the invention causes one tuning fork to be compressed and the other to be under tension. As a result of these differences in construction, the invention has greater sensitivity and reliability than Southworth.

Another tuning fork accelerometer is shown in U.S. Pat. No. 3,319,472, of Reefmen. In this patent, a single tuning fork having one end fixed and the other end free relies upon the physical deflection of the fork tines (under acceleration perpendicular to the tine axis) as an index of the acceleration. This deflection is sensed by magnetic pick-up coils. It is not a frequency changing effect and the accelerometer design has little resemblance to the invention.

A miniature quartz transducer which is utilized in the preferred embodiment of this invention is shown in U.S. Pat. No. 4,215,570 of Eer Nisse. In this invention a rectangular plate of quartz crystal has a continuous end portion at either end and a longitudinal slot connecting each end portion, forming a pair of parallel, spaced beams. Metal electrodes are formed on the transducer for exciting it and providing an electrical output therefrom.

SUMMARY OF THE INVENTION

It is an object of this invention to provide a sensitive, stable, inexpensive, low-power, wide-range accelerometer.

It is another object of this invention to provide a cantilever resonator accelerometer.

It is still another object of this invention to provide a quartz transducer accelerometer yielding a minimum torque.

It is still another object of this invention to provide a digital accelerometer which operates at practical frequencies.

Additional objects, advantages, and novel features of the invention will become apparent to those skilled in the art upon examination of the following description or may be learned by practice of the invention. The objects and advantages of the invention may be realized and obtained by means of the instrumentalities and combinations particularly pointed out in the appended claims.

To achieve the foregoing in other objects and in accordance with the purpose of the present invention, as embodied and broadly described herein, the accelerometer of this invention may consist of a base and an acceleration sensitive resonator fastened to the base, the resonator consisting of a mass and pair of elongate resonating members, each member having one end rigidly fastened to the base and an opposed end rigidly fastened to the mass, the members being spaced apart. In a preferred embodiment, each resonating member comprises a double-ended tuning fork which is aligned with, and parallel to, the other tuning fork.

BRIEF DESCRIPTION OF THE DRAWINGS

The accompanying drawings, which are incorporated and form a part of this specification, illustrate an embodiment of the present invention and, together with the description, serve to explain the principles of the invention.

FIG. 4 shows a second embodiment of the invention.

FIG. 5 shows a third embodiment of the invention.

DETAIL DESCRIPTION OF THE INVENTION

The accelerometer of this invention broadly consists of base 1 and cantilever acceleration sensitive resonator 10 affixed to base 1.

Figure 1:
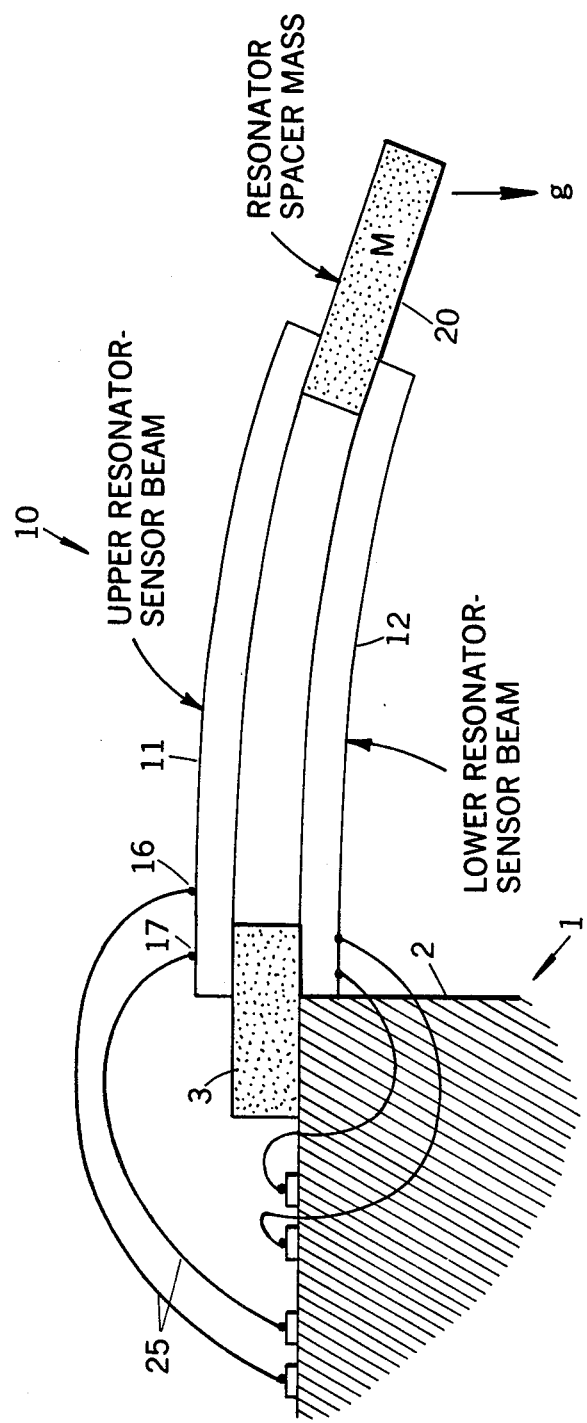
FIG. 1 shows a side view of the invention under an accelerating force.

As shown in the embodiment of FIG. 1, base 1 comprises mount 2 and spacer 3, and resonator 10 comprises upper resonator 11, lower resonator 12, and spacer mass 20. Resonator 10 is attached at one end to spacer 3. Electrical connections 25 are provided to energize each resonator and provide for detection of changes in frequency as disclosed hereinafter.

In operation, the vibrational mode of each of upper resonator 11 and lower resonator 12 is excited, causing the resonators to vibrate. Preferably, each resonator vibrates "independently" of the other resonator, as absolutely *no* coupling between resonators is desirable. The frequency of each resonator is dependent on the state of tensile or compressive stress in the resonator and is therefore sensitive to acceleration forces present. These forces are applied perpendicular to the axis of the resonator as shown in FIG. 1, causing one bar to stretch and the other bar to compress. The changes in frequency caused by the force may be detected as hereinafter described to provide a digital output proportional to the applied acceleration.

Figure 2:
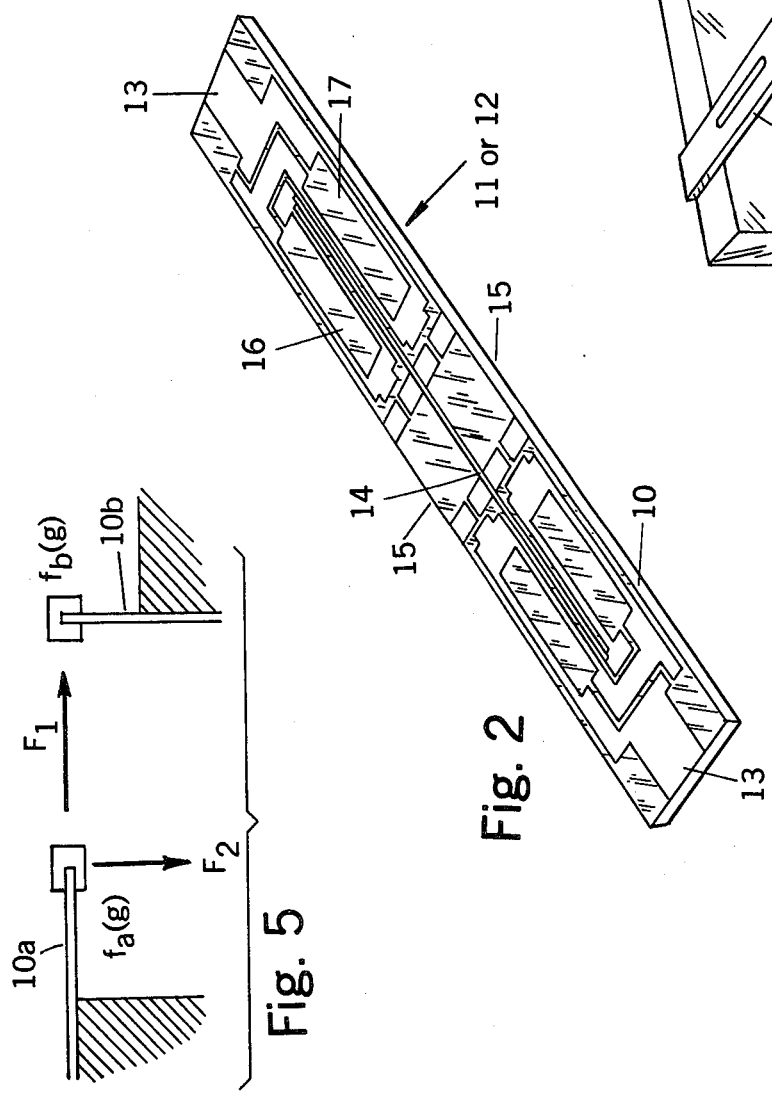
FIG. 2 is a perspective view of a preferred embodiment of a resonating member.

In a preferred embodiment of the invention, each resonator 11, 12 may comprise a double-ended tuning fork of the type disclosed in aforementioned U.S. Pat. No. 4,215,570. FIG. 2 shows a resonator as disclosed in this patent, where either of resonators 11, 12 comprise two tuning forks secured end-to-end. This resonator has two opposed end portions 13, and a longitudinal slot 14 extending therebetween. Vibratory portions 15 extend between the end portions on either side of slot 14. The rectangular resonator is constructed from quartz and has electrode patterns 16 and 17 plated on its surface for application of electrical signals as described hereafter. A complete description of resonators 11, 12 may be found in U.S. Pat. No. 4,215,570, the disclosure of which patent is incorporated herein by reference.

The theory of operation of the invention is as follows. The frequency of a vibrating beam under tension is expressed mathematically as a power series function of the applied axial load T as $$2\pi f = 6.4586 \frac{w}{L^2} \sqrt{\frac{E}{\rho}} \left[ 1 + 0.09831 \left( \frac{L^2 T}{8EI} \right) - 0.0053 \left( \frac{L^2 T}{8EI} \right)^2 + \cdots \right]$$

or, to first approximation $$\frac{\Delta f}{f} = 0.09831 \frac{L^2 T}{8EI} = 0.09831 \frac{L^2 wt}{8EI} \cdot S$$

where L is the length of the beam, E its modulus of elasticity, I is the moment of inertia relative to its vibrational direction, w and t the width and thickness, respectively, of the beam, and S, the stress in the beam produced by the load T. For the cantilever beam composite structure, the stress S in the top beam, under an acceleration load on the mass m, as shown in FIG. 1, is a tensile stress while the stress in the bottom beam is compressive. The frequency of the top beam resonator therefore is shifted, under an acceleration induced stress, positively, while the frequency of the bottom beam is shifted negatively. The difference frequency between the two beams is thus seen to be twice that of the frequency shift in each beam, according to the following formula:

$$f\text{upper} - f\text{lower} = f_{ou} + \Delta f_g - (f_{ol} - \Delta f_g) = f_{ou} - f_{ol} + 2\Delta f_g.$$

where fou and fol are the frequencies of the unaccelerated upper and lower resonator sensors and $\Delta f_g$ is the frequency shift caused by the acceleration g.

By using "thermally matched" resonators as top and bottom beam members, a further advantage accrues in that the acceleration sensitive difference frequency, $2\Delta f_g$, can be made insensitive to any temperature dependence of the individual resonator's natural frequencies, fol and fou.

Figure 3:
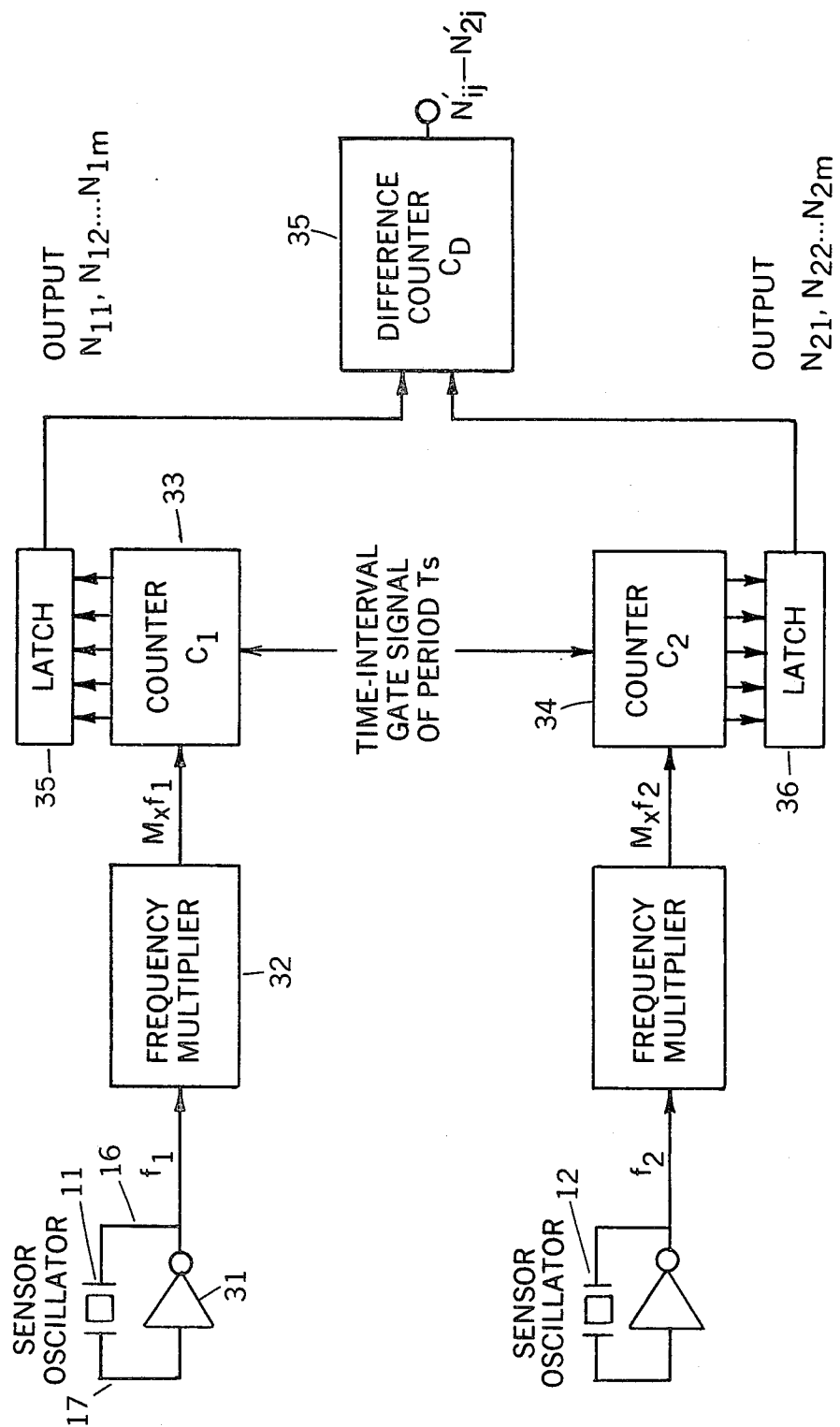
FIG. 3 shows circuitry which may be used with the invention.

Electronic circuitry 30 which may be used in the practice of this invention is shown on FIG. 3. As shown in this Figure, oscillator 31 includes quartz resonator beam 11 and is connected thereto by wires 25 to connection points 16, 17. The output of oscillator 31 is multiplied by frequency multiplier 32 and fed to gated counter 33. Resonator beam 12 is likewise connected to an identical circuit which includes counter 34. In operation, each counter 33, 34 is interrogated every T-seconds by a time-interval gate signal generated from a control clock (not shown). The counts recorded by counter 33 are dumped into latch 35 while the counts in counter 34 are dumped into latch 36. Difference counter 35 first takes the difference between two successive counts from counter 33 and then takes the difference between two successive counts from counter 34. These values are then subtracted from each other to provide the acceleration produced frequency shift over the time interval over the gate signal. By first taking the differences between two successive counts, the system does not lose counts and the typical plus or minus one count per sampling time electronic counting error is avoided.

In one embodiment of the invention, each of beams 11, 12 is approximately 400 mils long, 5 mils thick and 20 mils wide. Mass 20 is in the form of 16 milligrams of gold approximately 10 mils thick by 70 mils wide by 70 mils long. The resonance of each beam is approximately 40 kHz, and the difference frequency noted upon an applied acceleration is approximately 100 to 300 Hz. The device has a sensitivity of approximately 2 Hz/g.

At a sacrifice of a factor of two in acceleration sensitivity, the cantilever structure may be configured as shown in FIG. 4 with one active resonator member 40 and one inactive beam member 41. With this embodiment of the invention, an additional "thermally matched", but not mass loaded, resonator 42 is used in a difference frequency operational mode to achieve an acceleration sensitive difference frequency that is not temperature dependent.

Although this embodiment has reduced sensitivity compared to the embodiment of FIG. 1, it has an advantage in that there is no mechanical coupling between the resonator members.

Because of the lack of motional constraints in the aforementioned cantilever designs, the accelerometer will be sensitive to transverse accelerations with a sensitivity ratio of 50 to 100 times its sensitivity to axial accelerations. This axial sensitivity can be compensated for by the configuration of FIG. 5 wherein two cantilevers 10a, 10b are employed in a mutually perpendicular orientation, each cantilever being a parallel beam resonator in accordance with the embodiment of FIG. 1.

As shown in this embodiement, the change in force due to acceleration g on each resonator is as follows:

$$\Delta fa(g) = Sa2*F_2 + Sa1*F_1 \; (Sa2 = 50 \text{ to } 100 * Sa1)$$

$$\Delta fb(g) = Sb1*F_1 + Sb2*F_2 \; (Sb1 = 50 \text{ to } 100 * Sb2)$$

where Sa1 and Sa2 are coefficients of $\Delta f$/unit force. These equations may be solved to yield $F_1$ and $F_2$ in terms of the other variables, all of which are either known or measured.

The particular sizes and equipment discussed above are cited merely to illustrate a particular embodiment of the invention. It is contemplated that the use of this invention may involve components having different sizes and arrangements as long as the principle, using a free standing, relatively small, mass between based acceleration sensitive resonators, is followed. For instance, the resonators may be plan rectangular sheets rather than the double-ended tuning forks disclosed, or may have configurations other than rectangular. In addition, it is contemplated that the resonators may not necessarily be parallel to one another or aligned one above the other, although this arrangement does minimize the effects of undesirable torques on the resonators. An accelerometer constructed in accordance with the principles of this invention will provide a sensitive measure of acceleration in a direction transverse to the axis of the resonator. It is intended that the scope of the invention be defined by the claims appended hereto.

I claim:

1. An accelerator comprising a base and a first free-standing acceleration sensitive resonator affixed to said base, said resonator consisting of:
   a resonator mass;
   a first elongate piezoelectric quartz force transducer having one end rigidly fastened to said base and an opposed end rigidly fastened to said mass;
   a second substantially identical transducer having one end rigidly fastened to said base and an opposed end rigidly fastened to said mass, each of said ends being spaced from a respective end of said first transducer;
   each of said transducers comprising a rectangular beam having a length greater than its width and a width greater than its thickness, said first transducer having a face in the length-width plane which is spaced from and opposing an equivalent face of said second transducer.

2. The accelerometer of claim 1 wherein said first transducer is parallel to said second transducer.

3. The accelerometer of claim 1 wherein said opposing beams are aligned.

4. The accelerometer of claim 3 wherein said opposing beams are parallel.

5. The accelerometer of claim 4 wherein each of said beams comprises a double-ended tuning fork.

6. The accelerometer of claim 1 further comprising an identical free-standing acceleration sensitive resonator identical to said first resonator and affixed to said base, said second resonator extending in a direction perpendicular to the axis of said first resonator.

7. An accelerometer comprising a base and a first free-standing acceleration sensitive resonator affixed to said base, said resonator consisting of:
   a resonator mass;
   a first elongate resonating member having one end rigidly fastened to said base and an opposed end rigidly fastened to said mass;
   an inactive, substantially identical member having one end rigidly fastened to said base and an opposed end rigidily fastened to said mass, each of said ends being spaced from a respective end of said first member; and
   a second resonating member substantially identical to said first resonating member, said second resonating member having one end rigidly fastened to said base and an opposed end free-standing, said second resonating member providing a temperature compensation signal for said first resonating member.

* * * * *